(12) United States Patent
Morello et al.

(10) Patent No.: US 10,004,219 B1
(45) Date of Patent: Jun. 26, 2018

(54) INSECT REPELLENT

(71) Applicant: Force Field Technologies, Fort Lee, NJ (US)

(72) Inventors: Gino F. Morello, Leonia, NJ (US); Warren A. Atheras, Leonia, NJ (US)

(73) Assignee: Force Field Technologies LLC, Fort Lee, NJ (US)

( * ) Notice: Subject to any disclaimer, the term of this patent is extended or adjusted under 35 U.S.C. 154(b) by 0 days. days.

(21) Appl. No.: 15/247,315

(22) Filed: Aug. 25, 2016

Related U.S. Application Data

(60) Provisional application No. 62/210,069, filed on Aug. 26, 2015.

(51) Int. Cl.
| | | |
|---|---|---|
| *G08B 23/00* | (2006.01) |
| *A01M 29/28* | (2011.01) |
| *A01K 1/03* | (2006.01) |
| *A22C 17/00* | (2006.01) |
| *A43C 19/00* | (2006.01) |
| *A44C 5/00* | (2006.01) |
| *A41D 1/04* | (2006.01) |

(52) U.S. Cl.
CPC ............. *A01M 29/28* (2013.01); *A01K 1/034* (2013.01); *A22C 17/00* (2013.01); *A41D 1/04* (2013.01); *A43C 19/00* (2013.01); *A44C 5/0007* (2013.01)

(58) Field of Classification Search
CPC ........ A01M 29/28; A01K 1/034; A22C 17/00; A41D 1/04; A43C 19/00; A44C 5/0007
USPC ...................................................... 340/573.2
See application file for complete search history.

(56) References Cited

U.S. PATENT DOCUMENTS

| | | | |
|---|---|---|---|
| 2003/0233694 A1* | 12/2003 | Wescombe-Down | A41D 13/012 2/2.15 |
| 2005/0039692 A1* | 2/2005 | Wescombe-Down | . A01K 79/02 119/220 |
| 2007/0022652 A1* | 2/2007 | Moore ..................... | A01M 1/24 43/112 |

* cited by examiner

*Primary Examiner* — Kerri McNally
(74) *Attorney, Agent, or Firm* — Merchant & Gould P.C.

(57) ABSTRACT

An insect repellant system includes a signal generator configured to receive a power input and provide first and second outputs. A first conductive element is connected to the first output and configured to electrically couple the first output to a subject to be protected. A second conductive element is connected to the second output and configured to electrically couple the second output to earth ground. The second conductive element is electrically isolated from the subject to be protected.

25 Claims, 11 Drawing Sheets

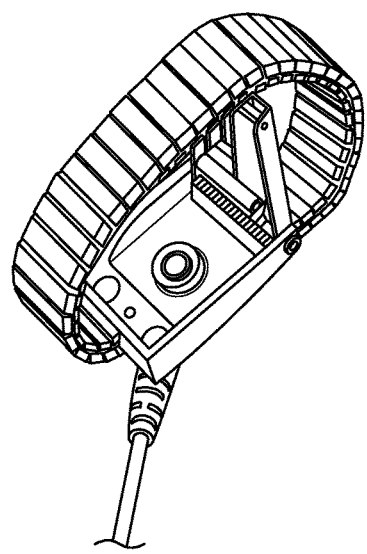
FIG. 5E
 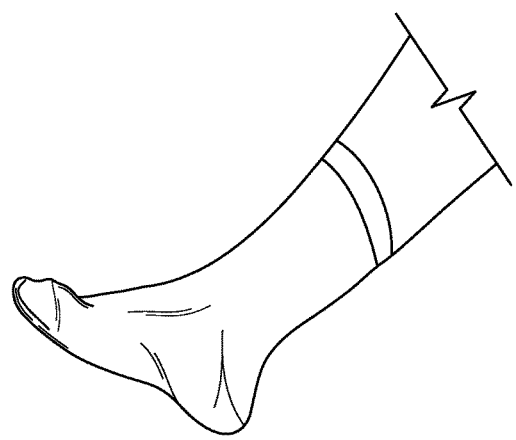
FIG. 6A  FIG. 6B

INSECT REPELLENT

CROSS-REFERENCE TO RELATED APPLICATION

This Application is a nonprovisional application claiming the benefit of U.S. Provisional Patent Application No. 62/210,069, filed on Aug. 26, 2015, which is incorporated by reference in its entirety.

BACKGROUND

This disclosure relates generally to insect repellent systems.

Insect repellents and related systems are employed in areas where mosquitoes, ticks, flies, etc. are prevalent or exist in high concentration. Although many insects are generally viewed as pests which may produce painful and/or itchy bites to humans and animals, these insects are also known to carry and transmit vector-borne infectious diseases. Vectors are living organisms that can transmit infectious diseases between humans or from animals to humans. Many of these vectors are bloodsucking insects, which ingest disease-producing microorganisms during a blood meal from an infected host (human or animal) and later inject it into a new host during their subsequent blood meal. Mosquitoes are the best known disease vector. Other vectors include ticks, flies, sandflies, fleas, triatomine bugs and some freshwater aquatic snails. Examples of vectors and diseases they transmit are listed below.

Mosquitoes
  *Aedes*
    Dengue fever
    Rift Valley fever
    Yellow fever
    Chikungunya
  *Anopheles*
    Malaria
  *Culex*
    Japanese encephalitis
    Lymphatic filariasis
    West Nile fever
Sandflies
Leishmaniasis
Sandfly fever (phelebotomus fever)
Ticks
Crimean-Congo haemorrhagic fever
Lyme disease
Relapsing fever (borreliosis)
Rickettsial diseases (spotted fever and Q fever)
Tick-borne encephalitis
Tularaemia
Triatomine bugs
Chagas disease (American trypanosomiasis)
Tsetse flies
Sleeping sickness (African trypanosomiasis)
Fleas
Plague (transmitted by fleas from rats to humans)
Rickettsiosis
Black flies
Onchocerciasis (river blindness)
Bed Bugs
  *Cimex lectularius*
    Allergic reactions to their bites, which can be severe.
      Effects ranging from no reaction to a small bite mark to, in rare cases, anaphylaxis (severe, whole-body reaction)
      Secondary infections of the skin from the bite reaction, such as impetigo, ecthyma, and lymphangitis
      Mental health impacts on people living in infested homes. Reported effects include anxiety, insomnia and systemic reactions.

Vector-borne diseases are illnesses caused by pathogens and parasites in human populations. Every year there are more than 1 billion cases and over 1 million deaths from vector-borne diseases such as malaria, dengue, schistosomiasis, human African trypanosomiasis, leishmaniasis, Chagas disease, yellow fever, Japanese encephalitis and onchocerciasis, globally. Vector-borne diseases account for over 17% of all infectious diseases. Distribution of these diseases is determined by a complex dynamic of environmental and social factors. Globalization of travel and trade, unplanned urbanization and environmental challenges such as climate change are having a significant impact on disease transmission in recent years. Some diseases, such as dengue, chikungunya and West Nile virus, are emerging in countries where they were previously unknown.

The World Health Organization (WHO), for example, responds to vector-borne diseases in many ways, including
  providing the best evidence for controlling vectors and protecting people against infection;
  providing technical support and guidance to countries so that they can effectively manage cases and outbreaks;
  supporting countries to improve their reporting systems and capture the true burden of the disease;
  providing training on clinical management, diagnosis and vector control with some of its collaborating centers throughout the world; and
  developing new tools to combat the vectors and deal with the disease, for example insecticide products and spraying technologies.

An important element in addressing vector-borne diseases is behavioral change. The WHO currently works with partners to provide education and improve awareness so that people know how to protect themselves and their communities from mosquitoes, ticks, bugs, flies and other vectors. For many diseases such as Chagas disease, malaria, schistosomiasis and leishmaniasis, WHO has initiated control programs using donated or subsidized medicines. Access to water and sanitation is a very important factor in disease control and elimination. WHO works together with many different government sectors to control these diseases.

Along with being annoying pests which result in potentially painful and itchy bug bites, insects worldwide are responsible for
  Vector-borne diseases account for more than 17% of all infectious diseases, causing more than 1 million deaths annually.
  More than 2.5 billion people in over 100 countries are at risk of contracting dengue alone.
  Malaria causes more than 600,000 deaths every year globally, most of them children under 5 years of age.
  Other diseases such as Chagas disease, leishmaniasis and schistosomiasis affect hundreds of millions of people worldwide.
  Many of these diseases are preventable through informed protective measures.

Changes in agricultural practices due to variation in temperature and rainfall can affect the transmission of vector-borne diseases. Climate information can be used to monitor and predict distribution and longer-term trends in malaria and other climate-sensitive diseases. (Source: WHO March, 2014).

Known insect repellent systems have largely been unsatisfactory.

SUMMARY

In accordance with certain aspects of the present disclosure, an insect repellant system includes a signal generator configured to receive a power input and provide first and second outputs. A first conductive element is connected to the first output and configured to electrically couple the first output to a subject to be protected. A second conductive element is connected to the second output and configured to electrically couple the second output to earth ground, and the second conductive element is electrically isolated from the subject to be protected.

BRIEF DESCRIPTION OF THE DRAWINGS

FIGS. 5A-5E illustrate further examples of conductive elements such as conductive wrist bands and watches suitable for use with the system illustrated in FIG. 1.

FIGS. 6A-6F illustrates further conductive elements such as garments made of conductive fabric suitable for use with the system illustrated in FIG. 1.

DETAILED DESCRIPTION

Figure 1:
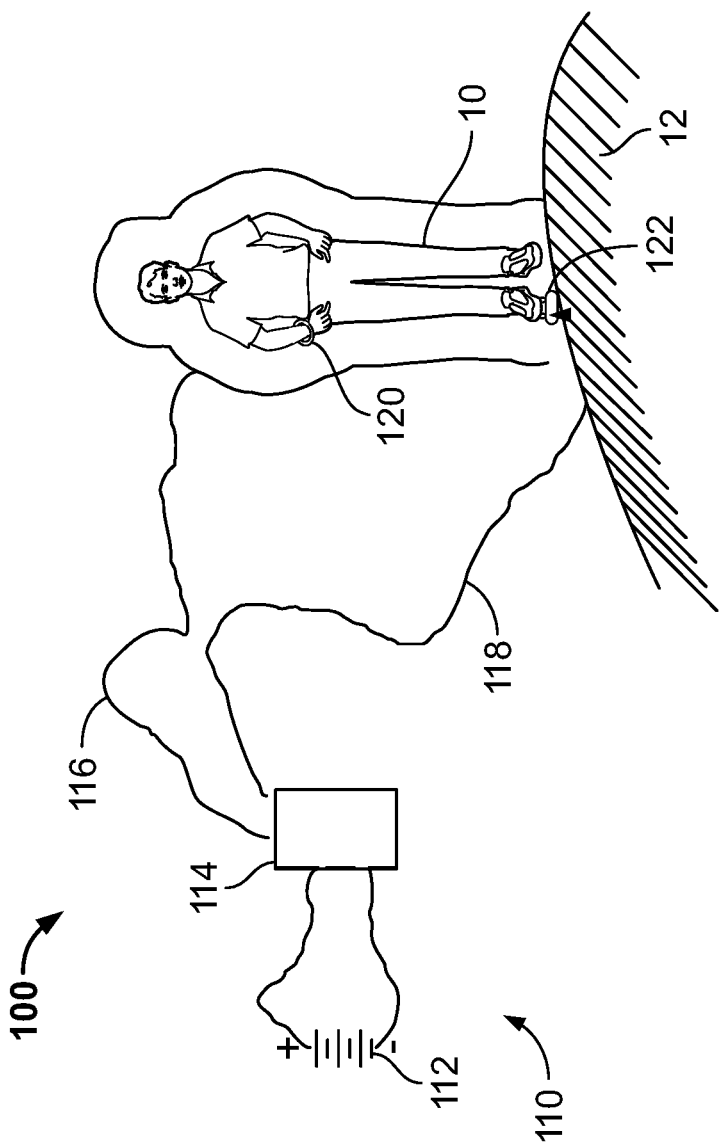
FIG. 1 schematically illustrates various components of an example electronic insect repellent system in accordance with the present disclosure.

In the following Detailed Description, reference is made to the accompanying drawings, which form a part hereof, and in which is shown by way of illustration specific embodiments in which the invention may be practiced. In this regard, directional terminology, such as top, bottom, front, back, etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense.

As noted above, many insects are not only pests, but also can carry and transmit vector-borne infectious diseases. Known insect repellent systems include chemical repellents which are applied to the skin as an aerosol or lotion (e.g. DEET or N,N-diethyl-m-toluamide), chemical repellents which are aerosolized or vaporized with a suitable apparatus (e.g. pump atomizer or heater), ultrasonic repellents which produce high-frequency acoustic waves which mimic the female mosquito for example, or high-voltage electrical discharge insect control systems (e.g. BugZapper).

Chemical spray repellents (also commonly called "bug spray") and lotions are substances applied to skin, clothing, or other surfaces which discourages insects (and arthropods in general) from landing or climbing on that surface. Tests of various insect repellents by an independent consumer organization found that repellents containing DEET or picaridin are more effective than repellents with "natural" active ingredients such as Birch or Citronella oils.

Repellent lanterns and appliances are typically powered by a single butane cartridge. Butane provides the cordless, portable heat that activates the devices.

The heat generated by the butane cartridge is directed to a metal grill that is part of the design of the Lantern or Appliance. A small mat, saturated with chemical repellent, sits on top of the metal grill. Heat vaporizes the repellent, allowing it to rise into the air.

The repellent may be, for example, Allethrin, a copy of a repellent that naturally occurs in chrysanthemum flowers. Representative devices are advertised to protect an approximate area of 15 feet by 15 feet.

A "Bug Zapper," more formally called an electrical discharge insect control system, is a device that attracts and kills flying insects that are attracted by light. In this device, a light source attracts insects to an electrical grid, where they are electrocuted by contacting two wires with a high voltage between them. The name stems from the characteristic zap sound produced when an insect is electrocuted. These devices are highly power consumptive, typically ac mains powered, and therefore not well-suited for portable or mobile use.

The aforementioned repellent systems have largely been unsatisfactory due to ineffectiveness, short run-times, portability, undesirable odors, links with health risks, and the like.

Among other things, an electronic insect repellent system is disclosed herein that includes a power source and a signal generator with outputs coupled to the subject to be protected. The generator outputs may be directly coupled, capacitively coupled, or both, for example. In certain embodiments, the electronic insect repellent system is worn by an individual on his/her person. In other embodiments, the electronic insect repellent system is connected to a tent or other structure to provide continuous protection to the subject while inside (e.g. sleeping).

A processor may be included for controlling the signal generator. The processor may be programmed, among other things, to determine and output signal strength based on body and ground impedance measurements for maximum effectiveness and efficiency. The processor may also be programmed to determine and output signal strength based on constant current control. In some implementations, the output signal strength may be selected by the user.

FIG. 1 illustrates an example of a system 100 for electronically repelling insects. The system 100 includes a wearable controller 110 that includes a power source 112 such as a battery, which is coupled to a signal generator 114. The output of the signal generator 114 is coupled to a subject 10, such as a human subject, to be protected from insects. In the example illustrated in FIG. 1, a positive output 116 of the signal generator 114 is coupled to the subject 10 via a conductive element, such as a conductive bracelet worn 120 about the subject's 10 wrist. Connections to the subject 10 may be implemented, for example, using a pressure-sensitive conductor, conductive pad, conductive ring, conductive band, conductive bracelet/anklet, etc.

A negative output 118 of the signal generator is coupled to earth ground 12 via a conductive element 122, such as a conductive shoe cover that is worn by, but insulated from the subject 10. Examples of the earth ground connection include a conductive shoe sole, slip-on shoe-mounted conductor or shoe cover, strap-on shoe-mounted conductor or shoe, etc.

In alternative examples, the outputs 116, 118 are indirectly coupled to both the subject 10 to be protected and earth ground 12. Indirect coupling may be achieved via a capacitive coupling mechanism or other electromagnetic coupling mechanism.

In some examples, the controller 110 of the system 100 depicted in FIG. 1 generates a 1.5 kvac, 50 kHz signal that is coupled to the subject 10 as described above. The system 100 generates an electronic shield 130 that extends uniformly around the subject 10 regardless of the point of attachment to the subject (e.g. upper arm, wrist, calf, ankle, etc.) to repel insects such as mosquitos. In the illustrated example, the shield 130 extends about six to twelve inches from the subject 10 in a uniform manner about the subject 10.

Figure 2:
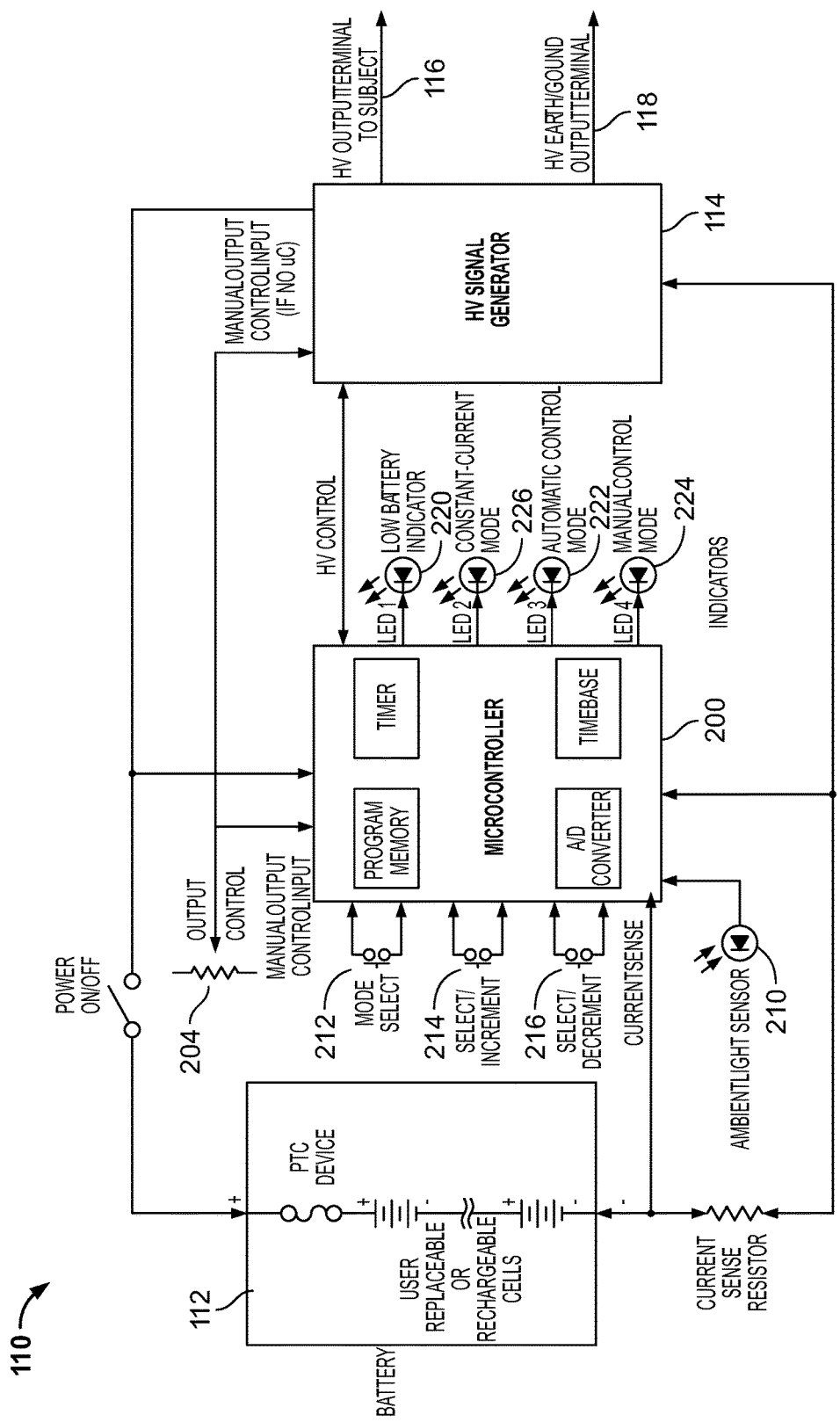
FIG. 2 is a block diagram illustrating aspects of an example controller module in accordance with the present disclosure.
Figure 3B:
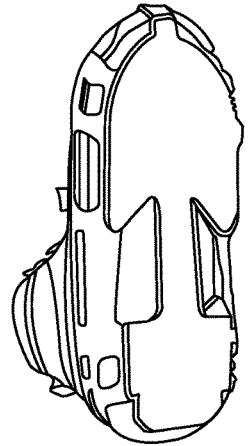
FIGS. 3A-3D illustrate examples of various conductive elements such as conductive straps and configurations suitable for use with the system illustrated in FIG. 1.
Figure 3D:
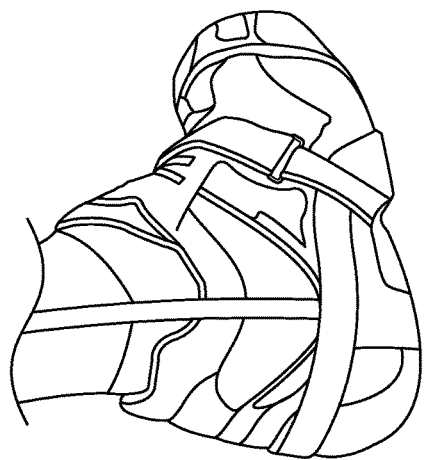
Figure 3A:
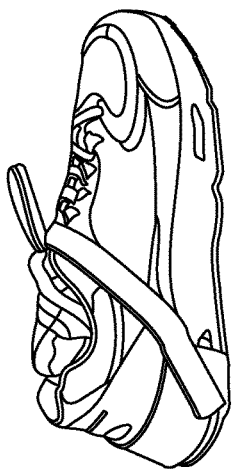
Figure 3C:
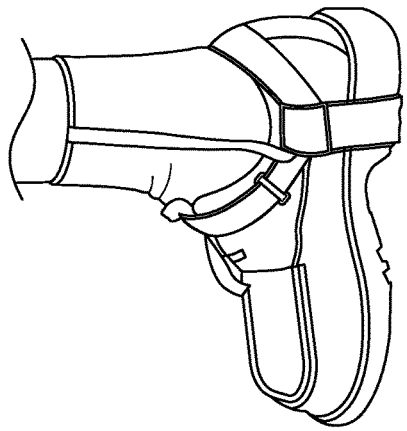
Figure 4A:
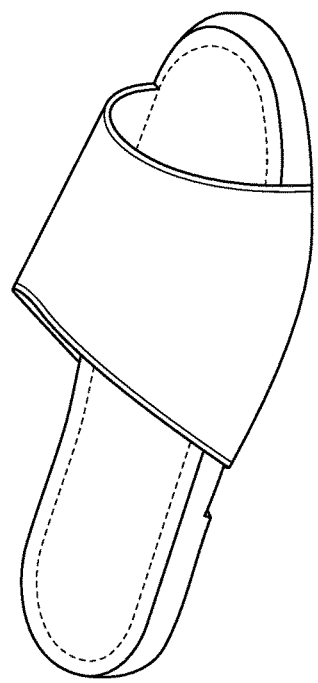
FIGS. 4A-4D illustrate further examples of conductive elements such as shoes, boots, clogs, and sneakers suitable for use with the system illustrated in FIG. 1.
Figure 4B:
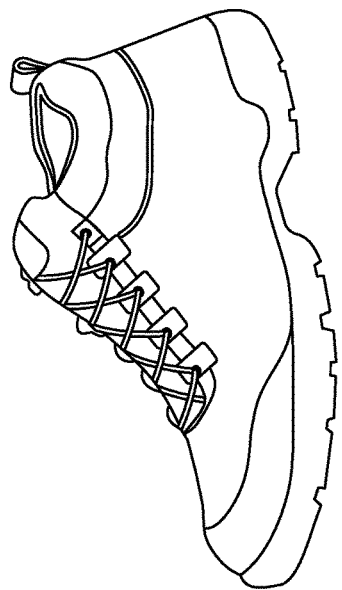
Figure 4C:
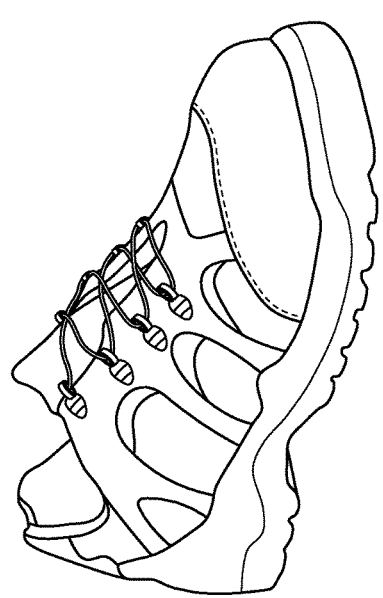
Figure 4D:
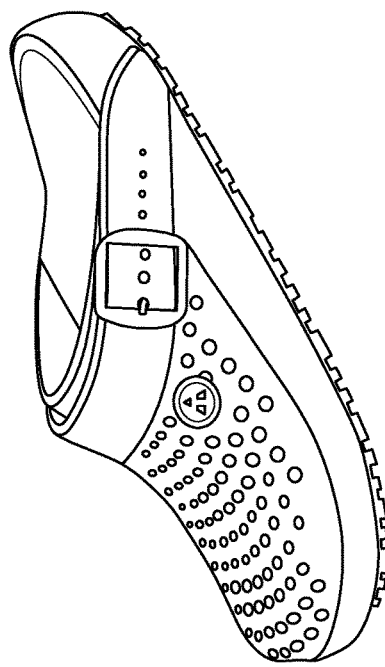
Figure 5B:
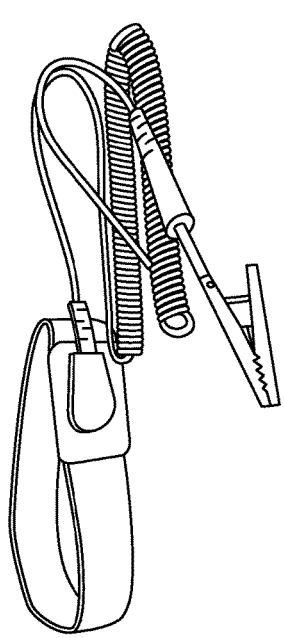
Figure 5D:
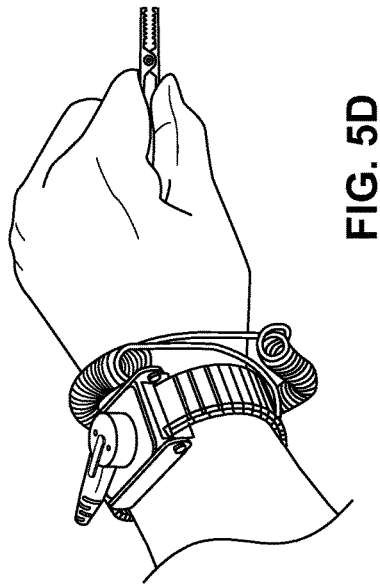
Figure 5A:
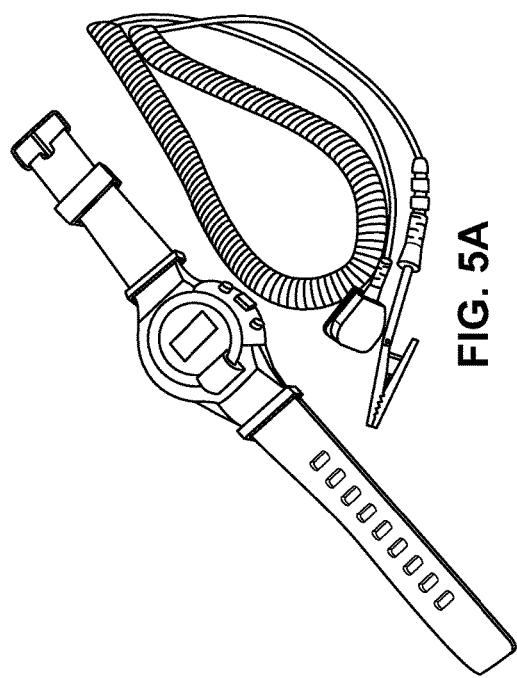
Figure 5C:
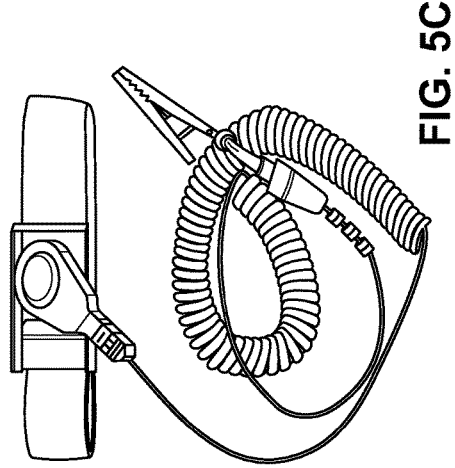
Figure 6C:
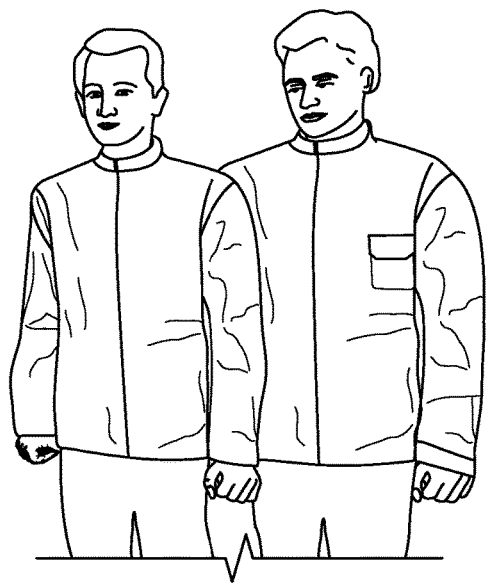
Figure 6D:
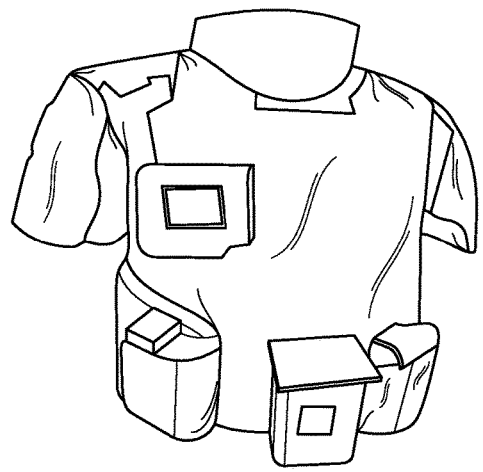
Figure 6E:
Figure 6F:

FIG. 2 illustrates an example of aspects of the controller 110. In some implementations, the controller 110 includes a dedicated circuit or a microprocessor 200 programmed to optimize the signal generator's 114 output for effectiveness, efficiency, and to maximize battery life automatically. For instance, the controller 110 could be programmed to automatically turn the device on and off at prescribed times (e.g. dusk) or prescribed ambient light levels (e.g. dusk). Alternatively, the controller 110 may be configured manually by a user to select the signal generator's 114 output for effectiveness, efficiency, and to maximize battery life.

In some examples, the controller 110 is programmed to generate an output signal based on constant-current control for consistent protection of the subject 10. The constant current mode provides efficient operation of the electronic insect repellent system. For example, current regulation can be implemented through the addition of an external control loop and current-sense resistor. The control loop may be implemented using discrete components including a current sense resistor, operational amplifier, voltage reference, and compensation network. Alternatively, the control loop may be implemented using a microcontroller, current sense resistor, voltage reference, onboard analog-to-digital controller, onboard digital-to-analog controller, and firmware to implement the loop's desired response similar to compensation network in discrete component implementation. Such a design must take into account the power limitations of the high-voltage dc-ac inverter and must ensure the stability of the converter's voltage loop. In the preferred embodiment, whether implemented as a discrete circuit or with a highly-integrated microcontroller, negative feedback is used to compare the target current to the actual current and the difference (i.e. error) is used to servo the high voltage generator's output such that actual current drive "tracks" the target current.

In this mode, the output of the system's high-voltage circuit is varied such that it increases the voltage output into higher-impedance loads and decreases the voltage output when driving lower impedance loads. As the load varies, the sense voltage across the system's current sense resistor will vary proportionately. Therefore, the current control mode will compare the sense voltage across the current sense resistor to a predetermined and/or programmable voltage threshold and servo the output such that the high-voltage generator's output voltage to the user is varied ensuring the voltage across the current sense resistor, proportional to output current, is held constant. The load may vary for several reasons including, but not limited to, ground (soil) resistivity, surface area of output terminal to earth ground, surface area of output terminal to user skin, skin resistivity, amount of perspiration on user, ambient temperature and humidity, and the like.

The closed-loop current control loop also serves to reduce (i.e. fold back) the generator's output signal amplitude in case one of the generator's two output signals is inadvertently connected (e.g. shorted) to the other or in the case the user inadvertently comes in to contact with both outputs simultaneously. In the former case, this protects the generator from damage. In the latter case, this mechanism protects the user from an inadvertent shock or tingling sensation due to the generator's output signal. Coupling may occur directly (i.e. both outputs connected to the user's skin) or indirectly (e.g. one output coupled directly to the user's skin and said output coupled inadvertently to ground via user contact with plants, trees, other vegetation).

It is recognized that in other embodiments the use of negative feedback may be replaced with other constant current circuits which do not rely on negative feedback. For example, a current-stable nonlinear transistor implementation may be used. These are implemented by active electronic components (transistors) having current-stable non-linear output characteristics when driven by steady input quantity (current or voltage). These circuits behave as dynamic resistors changing their present resistance to compensate for current variations.

As shown in FIG. 2, the example controller 110 includes a high-voltage AC signal generator 114 with variable output control. The output may be controlled manually with a potentiometer 204 or by an encoder input, for example. In the embodiment depicted in Figure, the signal generator 114 is managed via a microcontroller 200. The microcontroller 200 is configured to vary the output based on manual input from the user or via algorithmic control. For example, the microcontroller may be programmed to vary the signal output based on time of day derived from an internal real-time clock/calendar (RTCC) which may be realized in hardware or software or a voltage signal proportional to ambient light from an ambient light sensor coupled to the microcontroller. The illustrated example includes an ambient light sensor 210 input along with a single pushbutton 212 used to set the device's operating mode and two pushbuttons 214, 216 used to step through the operating modes and to increment or decrement user input (e.g. setting time, setting time of day activation/deactivation, or light level activation/deactivation thresholds for example, signal output level, etc.). There are also several LED indicators used to alert the user to various conditions including a low battery indicator 220, Device is in Automatic Control Mode indicator 222 (i.e. algorithm based as described above), Manual Control Mode indicator 224 (user simply adjusts potentiometer/encoder to raise or lower output signal), and Constant-Current Mode indicator 226 (used to ensure that the HV generator's output is maintained independent of varying body/ground impedances). All of the modes could be realized with the microcontroller 200, or in other implementations, by discrete component design.

In some embodiments, the controller 110 outputs a continuous sinusoidal output. Other implementations include a "Signal Type" selection option which, for example, is configured to control the high-frequency generator output waveshape and may include sinusoidal, square, triangular, or other aperiodic or periodic signal types. Such periodic waveshapes are richer in harmonic content and therefore more broad-banded in spectrum, possibly resulting in greater repelling capability. The example illustrated in FIGS. 1 and 2 details a 1.5 kVAC, 50 kHz signal; however, the output signal amplitude, frequency spectrum, output power, periodicity, waveshape, duty-cycle etc. may be varied as desired for maximum repelling performance. Further, an output signal of zero frequency (i.e. DC) may also provide repelling action and may be selected by the user.

In some embodiments, the controller 110 includes an "Application" selection option which, for example, is configured to control the high-frequency generator's output signal to optimally repel insects based on the user's selected "Application" mode which may include "Personal Use", "Automobile", "Tent", "Whole House", "Water Well", "Dog Crate", etc. Further, signal generator's output signal (i.e. amplitude, frequency, waveshape, duty-cycle, etc.) may be configured for each predetermined operating mode or use scenario.

FIGS. 3A-3D illustrate various conductive straps and configurations, and FIGS. 4A-4D illustrate various conductive shoes, boots, clogs, and sneakers which may be used to couple the earth or ground output 118 to the subject's 10 foot. FIGS. 5A-5E illustrate various conductive straps, socks, watches, and configurations which may be used to couple the generator's signal output 116 to the subject's 10 wrists or ankles. FIGS. 6A-6F illustrate various garments made of conductive fabric which may be used to couple the generator's signal output 116 to the subject 10. In the case where the generator includes an "Application" selection option, the user would configure the generator "Application" mode to "Personal Use" for optimal repelling action in the above scenarios.

Figure 7:
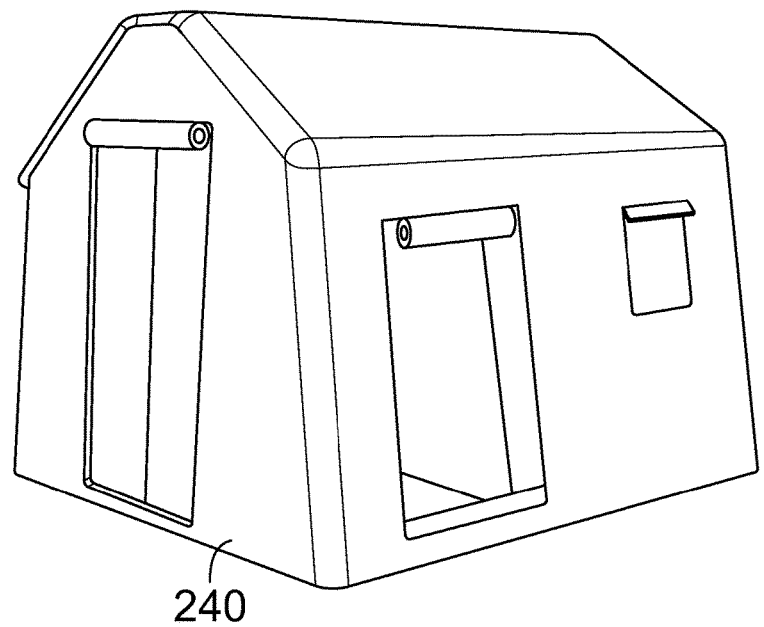
FIG. 7 illustrates a tent suitable for use with an alternative configuration of the system illustrated in FIG. 1.

In other examples, the controller 110 outputs 116, 118 are coupled to elements of a structure surrounding the subject 10. In this example, the surrounding structure is configured to provide the repelling field which protects the subject(s) 10 who remains inside the structure. FIG. 7 illustrates a tent 240 made of a conductive fabric material that is insulated from the ground 12. The conductive material of the tent 240 couples the generator's signal output 116 to the subject 10. The signal generator's earth ground connection 118 is made, for example, via a semi-permanent ground connection from the base of the tent 240 to earth 12 using a conductive spike or similar connection such as one of the tent's 240 conductive hold-down stakes.

The conductive fabric of the tent 240 could be electrically isolated from earth 12, for example, by laying down a plastic water impermeable tarp with the edges rolled under to prevent rain from coming over the tarp during a rainstorm (especially if setup on the side of a mountain or hill). The tent 240 is then assembled on the top flat portion of the tarp. Thus, tent 240 is conductive to couple the output 116 to the subject, but isolated from ground 12. The controllers ground output 118 could then be connected a grounding stake as described above. In the case where the generator 114 includes an "Application" selection option, the user would configure the generator "Application" mode to "Tent" for optimal repelling action in the above scenarios.

Figure 8:
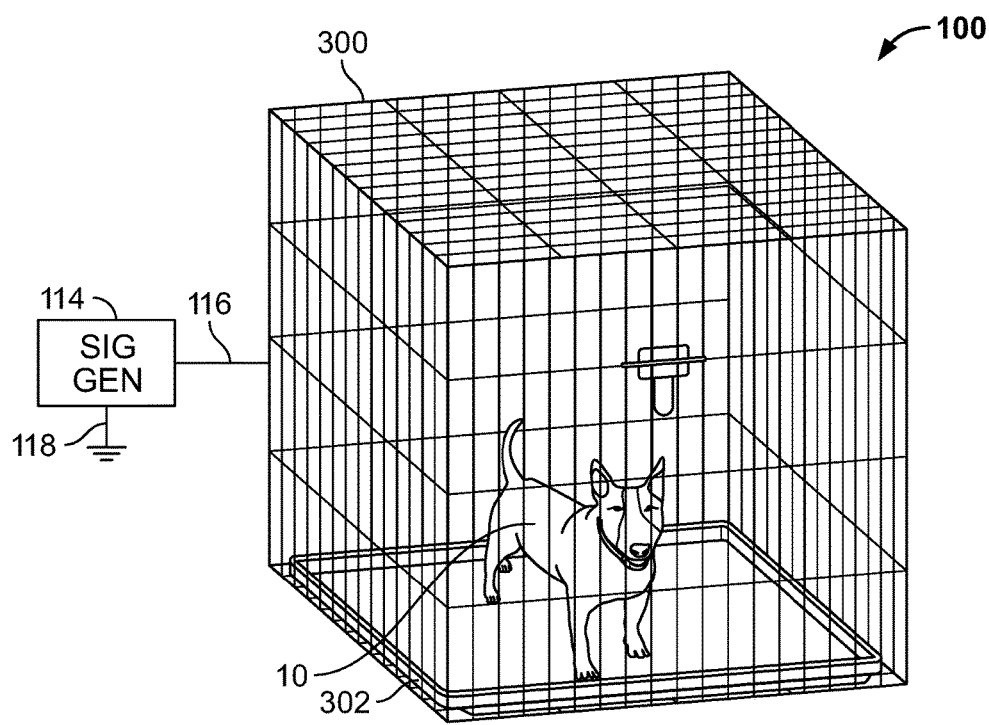
FIG. 8 illustrates a metal dog crate of an alternative configuration of the system illustrated in FIG. 1.

In further examples, the controller 110 outputs 116, 118 are coupled to elements of another structure surrounding the subject 10. In this example, the surrounding structure's metallic elements are configured to provide the repelling field which protects the subject(s) 10 who remain within the structure. In certain embodiments, the structure's elements may include metallic screen doors and screen windows and/or their respective metallic frames, metallic gutters and leaders. Further, in some embodiments, the subject 10 is not necessarily a human. For example, FIG. 8 illustrates an example where the subject 10 is a pet, such as a domesticated dog, and the structure surrounding the subject 10 is a metal pet crate or kennel 300 with the generator 114 outputs 116, 118 are coupled thereto. The metal crate 300 has an electrically insulated floor platform 302 upon which the subject 10 stands.

Figure 9:
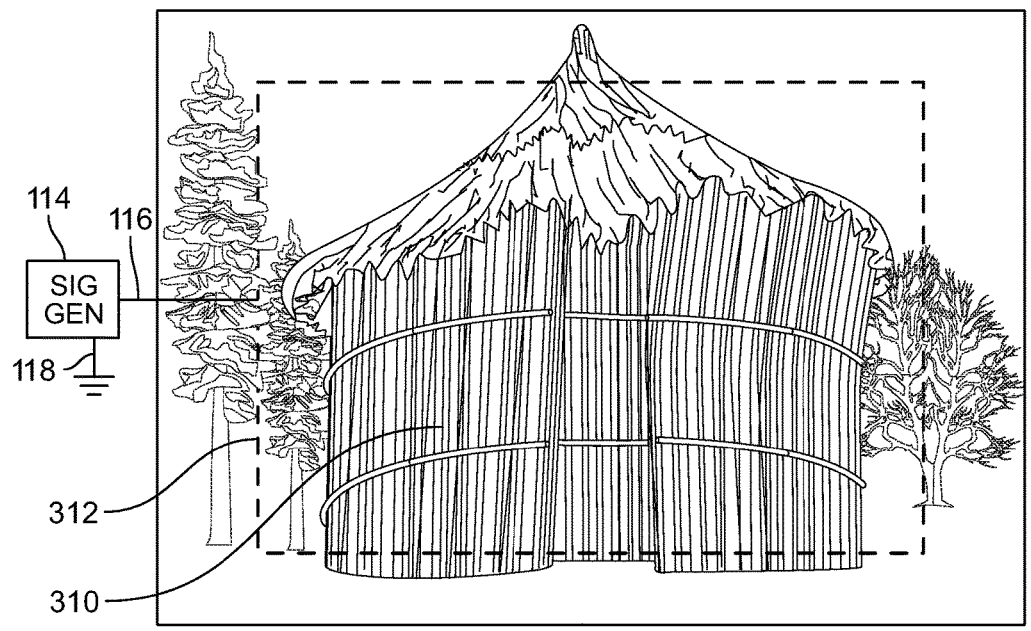
FIG. 9 illustrates a non-metallic hut of an alternative configuration of the system illustrated in FIG. 1.

In some areas, dwellings may consist of huts or other structures without metallic elements. For such nonmetallic structures, a universal adaptable conductive sheet or curtain (e.g. highly flexible metallic screen mesh) may be placed contiguously around the walls of the structure and on the ceiling or roof and then connected to the signal generator 114. FIG. 9 illustrates an example of a nonmetallic hut 310 including a conductive sheet (represented by a broken line 312) situated contiguously around the structure 210 and connected to the signal generator 114 outputs 116, 118. The universal adaptive conductive sheet or curtain 312 may be perforated to allow air to pass through, or non-perforated.

The screen may also be used over a bed, crib, pet crate or only in a dwelling's specific room for localized protection. In the example shown in FIG. 8, the signal generator's first output 116 may be connected directly to the crate 300, and the signal generator's second output 118 may be connected to ground (e.g. via a radiator pipe, outlet ground, etc.) Additionally, the generator 114 may be coupled to a universal adaptable conductive sheet or curtain 312 and ground connection, with the universal adaptable conductive sheet or curtain 312 placed over a water well or water hole. This will have the benefit of repelling insects or other pests that may infect the drinking water or lay their eggs therein.

Figure 10:
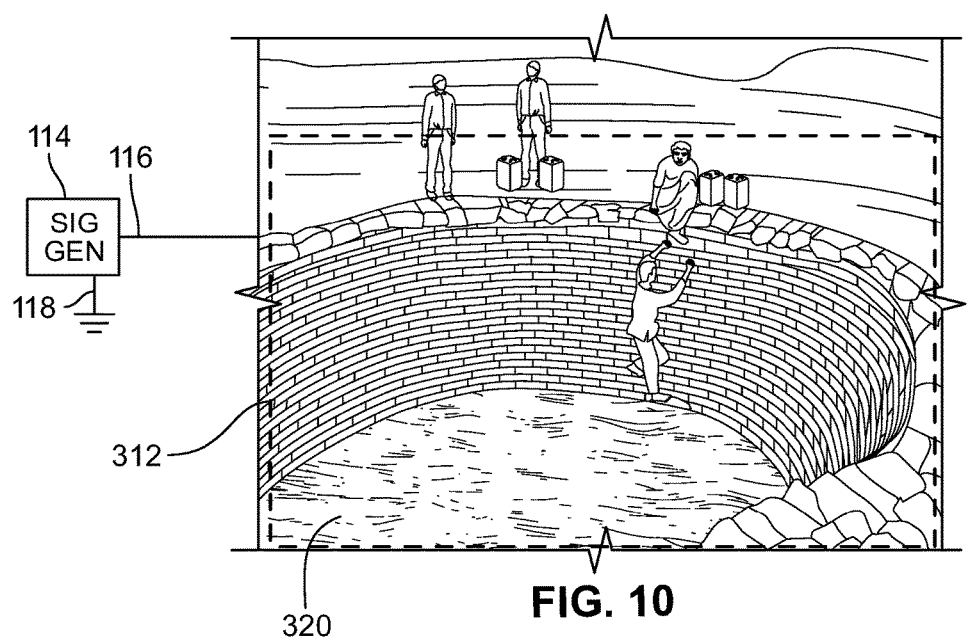
FIG. 10 illustrates a water well of an alternative configuration of the system illustrated in FIG. 1.
Figure 11:
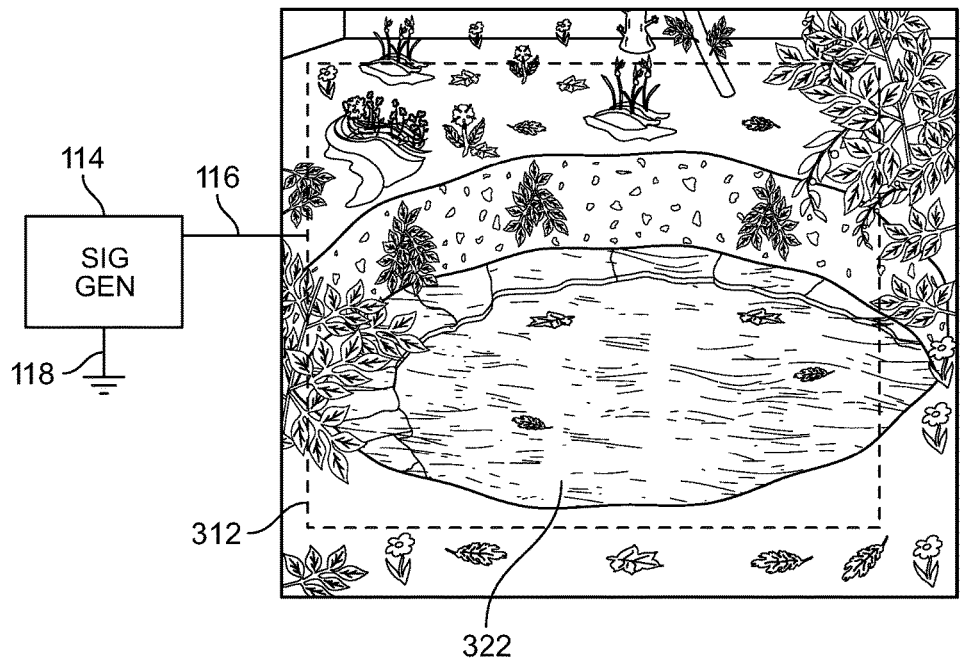
FIG. 11 illustrates a water hole of an alternative configuration of the system illustrated in FIG. 1.

FIGS. 10 and 11 illustrate examples of a water well 320 and a water hole 322, respectively, with the universal adaptable conductive sheet or curtain 312 situated thereabout. The signal generator 114 is connected to the universal adaptable conductive sheet or curtain 312 via the outputs 116, 118.

Figure 12:
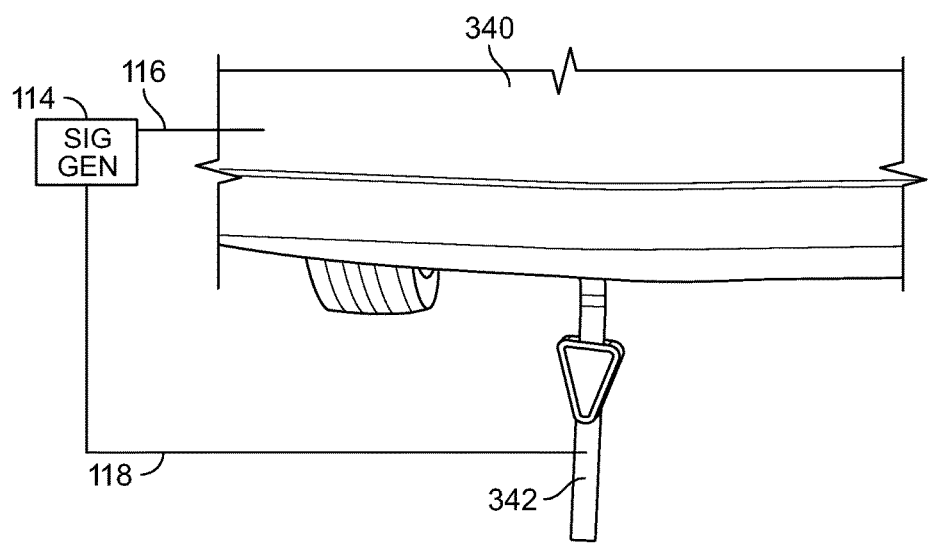
FIG. 12 illustrates aspects of an automobile configured for use with an alternative configuration of the system illustrated in FIG. 1.

The universal adaptable conductive sheet or curtain 312 may be placed over various structures, pipes, holes, inlets, outlets to prevent insects from entering and/or nesting. The universal adaptable conductive sheet or curtain 312 may also be placed over intakes and exhausts on engines and related sensors (e.g. aircraft) to prevent insects from entering and nesting. Still further, in other examples the signal generator 114 is connected to a vehicle such as an automobile, truck, bus, train, etc. to protect subjects inside the vehicle. FIG. 12 illustrates an example in which the first output 116 is coupled to the chassis and/or body of an automobile 340, with the second output 118 coupled to ground via a conductive ground strap 342 or similar device that is electrically insulated from the vehicle's chassis and body.

Figure 13:
FIG. 13 illustrates meat hung and configured for use with an alternative configuration of the system illustrated in FIG. 1.
Figure 14:
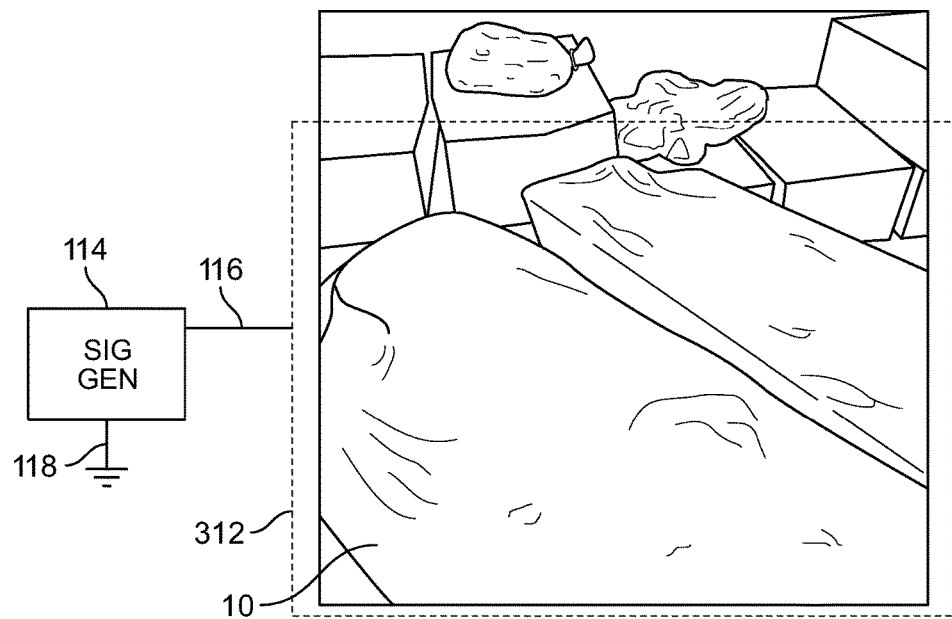
FIG. 14 illustrates meat on pallets and configured for use with an alternative configuration of the system illustrated in FIG. 1.

In other examples, the universal adaptable conductive sheet 312 is be placed over food items to prevent flies and other insects from landing on them. In such embodiments, the subject 10 is the food items, such as meat. FIGS. 13 and 14 illustrate examples where the protected subject 10 is meat intended for human consumption. In FIG. 13, the illustrated meat subject 10 is hung and waiting for inspection, and in FIG. 14 the meat subject 10 is boxed on pallets and waiting for inspection. The universal adaptable conductive sheet 312 is situated over the meat subject 10, with the outputs 116, 118 of the signal generator 114 coupled thereto.

In all of the aforementioned scenarios which use the universal adaptable conductive sheet or curtain 312, the sheet 312 must be electrically isolated from ground. In one embodiment, electrical isolation from ground may be ensured by embedding the universal adaptable conductive sheet or curtain 312 within an insulative sheath or coating.

Various modifications and alterations of this disclosure may become apparent to those skilled in the art without departing from the scope and spirit of this disclosure, and it should be understood that the scope of this disclosure is not to be unduly limited to the illustrative examples set forth herein.

What is claimed is:

1. An insect repellant system, comprising:
   a signal generator configured to receive a power input and provide first and second outputs;
   a first conductive element connected to the first output and configured to electrically couple the first output to a subject to be protected; and
   a second conductive element connected to the second output and configured to electrically couple the second output to earth ground, the second conductive element being electrically isolated from the subject to be protected.

2. The system of claim 1, further comprising a controller coupled to the signal generator configured to vary a signal output by the first output.

3. The system of claim 2, wherein the controller includes a microprocessor.

4. The system of claim 2, wherein the controller includes a dedicated circuit.

5. The system of claim 2, wherein the controller is configured to optimize the signal output for effectiveness, efficiency, and to maximize battery life automatically.

6. The system of claim 2, wherein the controller is configured to generate the signal output based on constant-current control for consistent protection.

7. The system of claim 6, wherein a constant-current control circuit provides current-limiting capability to protect the generator from damage in the event the generator's first output is inadvertently connected to the generator's second output.

8. The system of claim 6, wherein the constant-current control circuit provides current-limiting capability to protect the user from inadvertent shock or a tingling sensation in the event the generator's first output and second output are inadvertently coupled to the user's skin simultaneously.

9. The system of claim 2, wherein the controller is configured to automatically turn the signal generator on and off at predetermined times.

10. The system of claim 9 wherein the predetermined times include dusk.

11. The system of claim 2, wherein the controller is configured to automatically turn the signal generator on and off in response to an ambient light level.

12. The system of claim 2, wherein the controller is configured for predetermined operating modes.

13. The system of claim 12, wherein predetermined operating modes include at least one of "Personal", "Vehicle", "Tent", "Whole House", "Pet Crate", and "Water Well".

14. The system of claim 13, wherein predetermined operating modes include configuring the signal generator's output signal for each predetermined operating mode or use scenario.

15. The system of claim 1, wherein the first and second conductive elements directly couple the first and second outputs to the subject and the earth ground, respectively.

16. The system of claim 1, wherein the first and second conductive elements indirectly couple the first and second outputs to the subject and the earth ground, respectively.

17. The system of claim 1, wherein the first conductive element contacts the user.

18. The system of claim 17, wherein the first conductive element is worn by the user.

19. The system of claim 17, wherein the first conductive element is incorporated in a structure, and the second conductive element is connected to the earth ground.

20. The system of claim 1, wherein the second conductive element is worn by the user.

21. The system of claim 19, wherein the first conductive element is a conductive sheet.

22. The system of claim 21 wherein the conductive sheet is non-perforated.

23. The system of claim 21 wherein the conductive sheet is perforated.

24. The system of claim 21 wherein the conductive sheet includes an electrically insulative sheath.

25. The system of claim 21, wherein the conductive sheet is placed over a defined area.

* * * * *